United States Patent
Liu et al.

(10) Patent No.: US 12,000,086 B2
(45) Date of Patent: Jun. 4, 2024

(54) COMPACT STEEL CORD

(71) Applicant: Jiangsu Xingda Steel Tyre Cord Co., Ltd., Jiangsu (CN)

(72) Inventors: Xiang Liu, Jiangsu (CN); Aiping Wang, Jiangsu (CN); Weiming Ma, Jiangsu (CN); Nianpeng Zhao, Jiangsu (CN); Xianghui Liu, Jiangsu (CN); Zengguang Ke, Jiangsu (CN); Hengxiang Cao, Jiangsu (CN)

(73) Assignee: Jiangsu Xingda Steel Tyre Cord Co., Ltd. (CN)

( * ) Notice: Subject to any disclaimer, the term of this patent is extended or adjusted under 35 U.S.C. 154(b) by 0 days.

(21) Appl. No.: 17/766,458

(22) PCT Filed: May 20, 2021

(86) PCT No.: PCT/CN2021/094764
§ 371 (c)(1),
(2) Date: Jul. 21, 2022

(87) PCT Pub. No.: WO2022/151623
PCT Pub. Date: Jul. 21, 2022

(65) Prior Publication Data
US 2024/0068159 A1    Feb. 29, 2024

(30) Foreign Application Priority Data
Jan. 15, 2021 (CN) .......................... 202110054964.4

(51) Int. Cl.
*D07B 1/06* (2006.01)
*D07B 1/16* (2006.01)

(52) U.S. Cl.
CPC ......... *D07B 1/0633* (2013.01); *D07B 1/0666* (2013.01); *D07B 1/162* (2013.01);
(Continued)

(58) Field of Classification Search
CPC .... D07B 1/0633; D07B 1/0666; D07B 1/162; D07B 2201/1036; D07B 2201/1052;
(Continued)

(56) References Cited

U.S. PATENT DOCUMENTS 1,481,934 A * 1/1924 Sunderland .......... D07B 1/0693
57/215
1,888,076 A * 11/1932 Evans ................... D07B 1/068
57/220

(Continued)

*Primary Examiner* — Bao-Thieu L Nguyen

(57) ABSTRACT

A compact steel cord is provided. The cord includes a core-filament I steel wire with a diameter of d0, and four middle-layer M steel wires with a diameter of d1 and eight outer-layer O steel wires with a diameter of d2 that are twisted around the core-filament I steel wire in the same lay direction and the same lay length. Gaps L are reserved between the outer-layer O steel wires, an average width of the gaps L is not smaller than 0.02 mm, and the total size of the gaps L is larger than d0 and smaller than d1. The steel cord of a stable structure can be obtained by controlling the proportion of the sizes of all layers of monofilaments, the rubber coating performance of a tire cord can also be improved, the corrosion resistance, fatigue resistance, impact resistance and adhesion retention of a tire are improved.

13 Claims, 1 Drawing Sheet

(52) U.S. Cl.
CPC ............... *D07B 2201/1036* (2013.01); *D07B 2201/1052* (2013.01); *D07B 2201/2006* (2013.01); *D07B 2201/2037* (2013.01); *D07B 2201/2051* (2013.01); *D07B 2501/2046* (2013.01)

(58) Field of Classification Search
CPC .... D07B 2201/2006; D07B 2201/2037; D07B 2201/2051; D07B 2501/2046
See application file for complete search history.

(56) References Cited

U.S. PATENT DOCUMENTS

| | | | | |
|---|---|---|---|---|
| 4,328,852 A * | 5/1982 | Poque | ..................... | B60C 9/26 57/223 |
| 4,365,467 A * | 12/1982 | Pellow | ................. | D07B 1/0673 57/212 |
| 4,887,422 A * | 12/1989 | Klees | ..................... | D07B 1/025 57/220 |
| 4,980,517 A * | 12/1990 | Cardas | ................. | H01B 7/0009 57/216 |
| 5,806,296 A * | 9/1998 | Kaneko | .................. | D07B 1/062 57/212 |
| 6,247,359 B1 * | 6/2001 | De Angelis | ............ | D07B 1/145 73/158 |
| 6,272,830 B1 * | 8/2001 | Morgan | ............... | D07B 1/0613 57/902 |
| 2010/0038112 A1 * | 2/2010 | Grether | ............. | H01B 13/0006 174/128.1 |
| 2011/0011486 A1 * | 1/2011 | Pottier | .................... | D07B 5/12 140/149 |
| 2012/0222869 A1 * | 9/2012 | Varkey | ................... | D07B 1/147 166/385 |
| 2013/0220506 A1 * | 8/2013 | Pottier | .................... | B60C 9/005 57/210 |
| 2017/0370046 A1 * | 12/2017 | Rommel | ................ | D07B 1/165 |
| 2020/0115850 A1 * | 4/2020 | Clement | ............. | D07B 1/0633 |

* cited by examiner

COMPACT STEEL CORD

FIELD

The present invention relates to the field of steel cords, and in particular, to a compact steel cord.

BACKGROUND

Steel cords are an important component in a radial tire framework material. At present, compact steel cords are widely produced and used. The compact steel cords form a compact cross-sectional structure by accommodating many steel wires in a limited cross-section.

However, the existing compact steel cords pay attention to how to prevent steel wires from sliding in the manufacturing process, especially the sliding between different layers, which leads to the instability of the steel cord structure. Therefore, the main consideration in the design and manufacture of the existing compact steel cord is how to narrow gaps between monofilaments, to ensure the stability of the structure. However, such a compact structure may prevent rubber from penetrating into the steel cord, and easily cause water vapor to penetrate along the steel cord and internal voids of the steel cord, reducing the corrosion resistance of the steel cord.

SUMMARY

For the problems above, the present invention proposes a compact steel cord.

To implement the technical objective above and achieve the technical effect above, the present invention is implemented through the following technical solution.

A compact steel cord, including a core-filament I steel wire with a diameter of d0, and four middle-layer M steel wires with a diameter of d1 and eight outer-layer O steel wires with a diameter of d2 that are twisted around the core-filament I steel wire in the same lay direction and the same lay length. Gaps L are reserved between the outer-layer O steel wires, an average width of the gaps L is not smaller than 0.02 mm, and the total size of the gaps L is larger than d0 and smaller than d1. The steel cord of such a structure has a compact and stable structure, and leaves effective gaps to satisfy the needs of rubber penetration.

Furthermore, to improve the stability of the steel cord structure, the outer-layer O steel wires include four first outer-layer O steel wires tangent to any two adjacent middle-layer M steel wires and other four second outer-layer O steel wires, and the second outer-layer O steel wires are located between two adjacent first outer-layer O steel wires. The four first outer-layer O steel wires are blocked in grooves formed by two adjacent middle-layer M steel wires, and form a stable triangular structure with two middle-layer M steel wires that are in contact with each other. The triangular structure formed by the four first outer-layer O steel wires and the two middle-layer M steel wires interacts around the core-filament I steel wire to form a framework structure of the compact steel cord of stable center. The other four second outer-layer O steel wires and the adjacent first outer-outer O steel wires on both sides form gaps L for rubber penetration, and the sliding range of the second outer-layer O steel wires is restricted by the adjacent first outer-outer O steel wires on both sides, so that the formed gaps L are evenly distributed in the circumferential direction, and rubber penetrates into the steel cords from 360° direction, to avoid dead angles. The steel cord of such a structure not only has a stable structure, but also satisfies the need for rubber penetration, to avoid the penetration of water vapor along the steel cord and the internal voids of the steel cord, thereby improving the corrosion resistance of the steel cord.

Furthermore, to enable the steel cord of a 1+4+8 structure of the present invention to implement the beneficial effect, the size relationship of monofilaments, i.e., d0, d1, d2 satisfy the following relationships:

$0.41 < (d0/d1) < 0.64;$ $1 < (d2/d1) < 1.32;$ and d0 is between 0.06 mm and 0.20 mm.

Preferably, d0, d1, and d2 further satisfy the following relationships:

$0.42 < (d0/d1) < 0.64;$ $1.13 < (d2/d1) < 1.32;$ and d0 is between 0.08 mm and 0.18 mm.

As a further improvement of the present invention, the tensile strengths of the core-filament I steel wire, the middle-layer M steel wire, and the outer-layer O steel wire are respectively Ts1, Ts2, and Ts3, which satisfy the following relationships:

$50 \text{ Mpa} < (Ts2-Ts1) < 400 \text{ Mpa};$ and $0 \text{ Mpa} \leq (Ts3-Ts2) < 400 \text{ Mpa}.$ As a further improvement of the present invention, Ts1, Ts2, and Ts3 satisfy the following relationships:

$50 \text{ Mpa} < (Ts2-Ts1) < 150 \text{ Mpa};$ and $0 \text{ Mpa} \leq (Ts3-Ts2) < 150 \text{ Mpa}.$ As a further improvement of the present invention, a wire rod used for the core-filament I steel wire includes the following components in percentage by weight: C≤0.86%, Mn 0.30-0.60%, Si 0.15-0.30%, P no more than 0.030%, S no more than 0.030%, and the balance of Fe.

As a further improvement of the present invention, a wire rod used for the middle-layer M steel wires and the outer-layer O steel wires includes the following components in percentage by weight: C 0.60-1.02%, Mn 0.30-0.70%, Si 0.15-0.30%, P no more than 0.030%, S no more than 0.030%, Cr no more than 0.35%, and the balance of Fe.

The present invention has the following beneficial effects: according to the steel cord of the 1+4+8 structure designed by the present invention, the steel cord of a stable structure can be obtained by controlling the sizes and proportions of all layers of monofilaments, an average width of the gaps L between the outer-layer O steel wires is not smaller than 0.02 mm, the rubber coating performance of a cord can be improved, the corrosion resistance, fatigue resistance, impact resistance and adhesion retention of a tire are improved, and the service life of the tire is prolonged. In addition, the steel cord of such a structure has low line density, and can effectively reduce the production cost of the tire.

Figure 1:
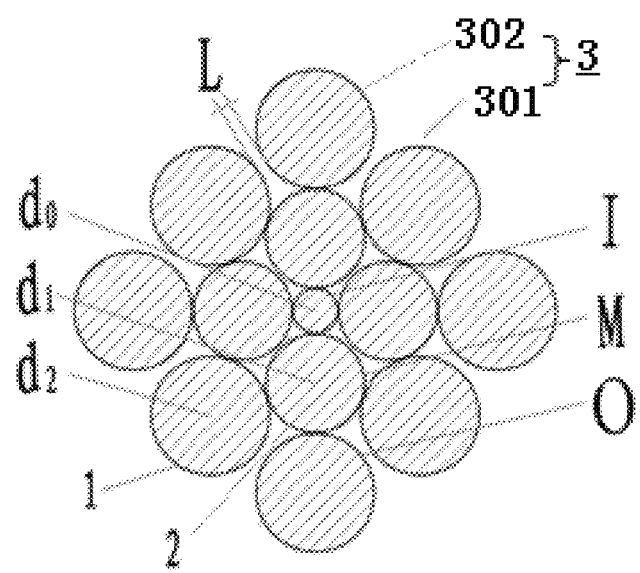
FIG. 1 is a schematic cross-sectional structure diagram of a steel cord of a 1+4+8 structure designed by the present invention.

In the figure, 1—core-filament I steel wire, 2—middle-layer M steel wire, 3—outer-layer O steel wire, 301—first outer-layer O steel wire, 302—second outer-layer O steel wire.

DETAILED DESCRIPTION

To make the objective, technical solution, and advantages of the present invention clearer, the following further describes the present invention in detail with reference to the embodiments. It is to be understood that the specific embodiments described herein are merely used for explaining the present invention but are not intended to limit the present invention.

The application principles of the present invention are described in detail below with reference to the embodiments.

FIG. 1 is a schematic cross-sectional structure diagram of a steel cord according to the present invention. As can be seen from the drawing, the structure of a compact steel cord includes a core-filament I steel wire 1 with a diameter of $d_0$, and four middle-layer M steel wires 2 with a diameter of $d_1$ and eight outer-layer O steel wires 3 with a diameter of $d_2$ that are twisted around the core-filament I steel wire 1 in the same lay direction and the same lay length. Two adjacent middle-layer M steel wires 2 can either have a gap or be in close contact. Four first outer-layer O steel wires 301 in the eight outer-layer O steel wires 3 are tangent to any two adjacent middle-layer M steel wires, and sink into the gap between the two middle-layer M steel wires 2, and the other four second outer-layer O steel wires 302 are respectively located between two adjacent first outer-layer O steel wires 301.

By adjusting a ratio of $d_0$ to $d_1$ to control the gap between the middle-layer M steel wires, it avoids that the total size of the gaps is larger than the size $d_0$ of the core-filament I steel wire 1 due to aggregation of the middle-layer M steel wires 2, so that the core-filament I steel wire 1 slides to the middle layer M to change the structure. In addition, by adjusting a ratio of $d_1$ to $d_2$ to control a gap between the outer-layer O steel wires 3, on the one hand, it avoids that the total size of the gaps L is larger than the size $d_1$ of the middle-layer M steel wire due to aggregation of the outer-layer O steel wires 3, so that the middle-layer M steel wire slides to the outer-layer O to change the structure; on the other hand, the first outer-layer O steel wires 301 effectively sink and are restricted in the grooves of the middle-layer M steel wires 2, and form circumferentially distributed gaps L with the second outer-layer O steel wires 302.

The steel cord produced by controlling the ratio of all layers of monofilaments of the steel cord can make the outer-layer O steel wires 3 form gaps L with an average gap width of at least 0.02 mm. Considering the relative sliding of the second outer-layer O steel wire 302, at least four of the formed gaps L are larger than 0.025 mm in size, which allows a rubber viscous fluid to penetrate into the M layers of the steel cord smoothly, improving the rubber coating performance of the cord. In addition, by controlling the ratio of all layers of monofilaments, the total size of the gaps L is larger than $d_0$ and smaller than $d_1$, which ensures the stability of the cord structure.

The steel cord according to the present invention is manufactured by the following method: the raw material is a steel wire rod, and the wire rod used for the core-filament I steel wire includes the following components in percentage by weight: C≤0.86%, Mn 0.30-0.60%, Si 0.15-0.30%, P no more than 0.030%, S no more than 0.030%, and the balance of Fe. A wire rod used for the middle-layer M steel wires and the outer-layer O steel wires includes the following components in percentage by weight: C 0.60-1.02%, Mn 0.30-0.70%, Si 0.15-0.30%, P no more than 0.030%, S no more than 0.030%, Cr no more than 0.35%, and the balance of Fe. The steel wire is drawn to the required size, so that when the steel cord is made, the tensile strengths Ts1, Ts2, and Ts3 of the core-filament I steel wire, the middle-layer M steel wire, and the outer-layer O steel wire satisfy the following relationships: 50 Mpa<(Ts2−Ts1)<400 Mpa; and 0 Mpa≤(Ts3−Ts2)<400 Mpa.

Preferably, 50 Mpa<(Ts2−Ts1)<150 Mpa; and 0 Mpa≤(Ts3−Ts2)<150 Mpa.

According to the description above, the present invention manufactures a steel cord with a minimum size ratio of the core-filament I steel wire 1, and parameters of each embodiment are shown in the following table:

TABLE 1

Size parameters of the steel cord manufactured in Examples 1-6

| | Unit | Example I | Example II | Example III |
|---|---|---|---|---|
| d0/d1/d2 (±0.01) | mm | 0.08/0.175/0.21 | 0.085/0.20/0.235 | 0.10/0.225/0.27 |
| Cord diameter (±5%) | mm | 0.85 | 0.955 | 1.09 |
| Lay length (±5%) | mm | 12.0 | 14.0 | 15.0 |
| Line density (±5%) | g/m | 2.99 | 3.80 | 4.97 |
| L | mm | 0.020 | 0.024 | 0.025 |

| | | Example IV | Example V | Example VI |
|---|---|---|---|---|
| d0/d1/d2 (±0.01) | mm | 0.11/0.25/0.30 | 0.13/0.295/0.35 | 0.16/0.33/0.395 |
| Cord diameter (±5%) | mm | 1.21 | 1.42 | 1.61 |
| Lay length (±5%) | mm | 16.0 | 18.0 | 20.0 |
| Line density (±5%) | g/m | 6.14 | 8.41 | 10.70 |
| L | mm | 0.027 | 0.034 | 0.041 |

It can be seen from Table 1 that all the gaps L between the outer-layer O steel wires 3 of the steel cords in Examples 1-6 are not smaller than 0.02 mm, which can meet the requirements for gaps in the rubber penetration process, making rubber enter the M layers of the steel cord.

Trial manufacture of cords is carried out according to the method of the present invention, and the performance of steel cords manufactured in Example II, Example III, and Example V are selected for testing, and compared with the performance of the steel cords with the same diameter in the structure in the prior art, the structure of the steel cord in the comparative example can be found in Chinese invention patents CN 209066179 U and CN 1898435 B, and the utility model patent CN 203034291 U. The specific rubber penetration test coating method is: cutting a section of steel cord and placing it in a mold box where rubber is placed, and then coating the other side of the placed steel cord with rubber; after a certain time period of high temperature and high pressure, forming a sample of the steel cord cured in rubber, taking a 25 mm sample, peeling off outer-layer O steel wires, and measuring an approximate length J and width K of an uncoated part of a sheath-layer steel wire, subscripts 1, 2, . . . , and M representing different uncoated parts; calculating an area of uncoated steel wires, dividing it by the total area of all steel wires obtained by multiplying the approximate width of the uncoated parts by 25 mm to obtain the percentage of the uncoated part; and subtracting this percentage from 1 to obtain the rubber coating percentage, i.e., the rubber coating rate Pc. See Formula (1) for details:

$$Pc = \left[1 - \frac{J_1 * K_1 + J_2 * K_2 + \ldots + J_M * K_M}{(K_1 + K_2 + \ldots + K_M) * 25}\right] \times 100\% \quad (1)$$

The test results are as shown in Table 2:

TABLE 2

Rubber penetration performance of the steel cords of the examples of the present invention and the comparative examples of the same diameter

| Item | Unit | Example II | Comparative Example CN 209066179 U 3 × 0.24/9 × 0.225 |
|---|---|---|---|
| d0 | mm | 0.085 | / |
| d1 | mm | 0.202 | 0.241 |
| d2 | mm | 0.235 | 0.226 |
| Cord diameter | mm | 0.958 | 0.942 |
| Lay direction | S/Z | S | S |
| Lay length | mm | 13.92 | 14.10 |
| Line density | g/m | 3.82 | 3.992 |
| Fracture load | N | 1481 | 1504 |
| Rubber penetration-coating rate (Pc) | % | 22.1 | 17.0 |

| Item | Unit | Example III | Comparative Example CN 1898435 B 0.22 + 18 × 0.20 |
|---|---|---|---|
| d0 | mm | 0.10 | 0.221 |
| d1 | mm | 0.226 | 0.202 |
| d2 | mm | 0.272 | 0.201 |
| Cord diameter | mm | 1.095 | 1.026 |
| Lay direction | S/Z | Z | Z |
| Lay length | mm | 15.1 | 12.36 |
| Line density | g/m | 5.03 | 4.89 |
| Fracture load | N | 2012 | 1889 |
| Rubber penetration-coating rate (Pc) | % | 24.2 | 0 |

| Item | Unit | Example V | Comparative Example CN 203034291 U 3 + 9 + 15 × 0.225 |
|---|---|---|---|
| d0 | mm | 0.13 | 0.226 |
| d1 | mm | 0.293 | 0.227 |
| d2 | mm | 0.351 | 0.226 |
| Cord diameter | mm | 1.42 | 1.394 |
| Lay direction | S/Z | Z | Z/Z/Z |
| Lay length | mm | 17.83 | 6.31/12.35/17.7 |
| Line density | g/m | 8.43 | 8.733 |
| Fracture load | N | 3026 | 3212 |
| Rubber penetration-coating rate (Pc) | % | 26.3 | 0 |

It can be seen from data in Table 2 that under the condition of the same diameter of the cords of the three examples and the comparative examples, the strengths of the same line density are basically the same, and the rubber coating performance of the cords of the examples is better than that of the cords of the comparative examples.

In addition, in this embodiment in Table 2, rubber penetration is not detected using a pressure drop. Because of the eight outer-layer O steel wires of the 1+4+8 structure, four first outer-layer O steel wires 301 are tangent to the adjacent middle-layer M steel wires 2, and sink into the gaps of the middle-layer M steel wires 2, to form four small triangular gaps. The rubber cannot fully penetrate to make the air flow through part of the gaps when the pressure drop is detected.

The basic principles and main features of the present invention and the advantages of the present invention are shown and described above. Those skilled in the art should understand that the present invention is not limited by the embodiments above. The embodiments above and the descriptions only illustrate the principles of the present invention. Various changes and improvements may be made to the present invention, without departing from the spirit and scope of the present invention. These changes and improvements all fall within the scope of the present invention. The scope of protection claimed by the present invention is defined by the appended claims and equivalents thereof.

What is claimed is:

1. A compact steel cord, comprising a core-filament I steel wire with a diameter of d0, and four middle-layer M steel wires with a diameter of d1 and eight outer-layer O steel wires with a diameter of d2 that are twisted around the core-filament I steel wire in a same lay direction and a same lay length, wherein
    gaps L are reserved between the outer-layer O steel wires, an average width of the gaps L is not less than 0.02 mm, and a total size of the gaps L is larger than d0 and smaller than d1;
    tensile strengths of the core-filament I steel wire, the middle-layer M steel wire and the outer-layer O steel wire are respectively Ts1, Ts2, and Ts3, which satisfy the following relationships:

50 Mpa<(Ts2−Ts1)<400 Mpa; and

0 Mpa≤(Ts3−Ts2)<400 Mpa.

2. The compact steel cord according to claim 1, wherein, the outer-layer O steel wires comprise four first outer-layer O steel wires tangent to any two adjacent middle-layer M steel wires and other four second outer-layer O steel wires, and the second outer-layer O steel wires are located between two adjacent first outer-layer O steel wires.

3. The compact steel cord according to claim 1, wherein, d0, d1, and d2 satisfy the following relationships:

0.41<(d0/d1)<0.64;

1<(d2/d1)<1.32; and d0 is between 0.06 mm and 0.20 mm.

4. The compact steel cord according to claim 3, wherein, d0, d1, and d2 further satisfy the following relationships:

0.42<(d0/d1)<0.64;

1.13<(d2/d1)<1.32; and d0 is between 0.08 mm and 0.18 mm.

5. The compact steel cord according to claim 1, wherein, TS1, Ts2, and Ts3 satisfy the following relationships:

50 Mpa<(Ts2−Ts1)<150 Mpa; and

0 Mpa≤(Ts3−Ts2)<150 Mpa.

6. The compact steel cord according to claim 1, wherein, a wire rod used for the core-filament I steel wire comprises the following components in percentage by weight of the wire rod: carbon≤0.86%, manganese in a range of 0.30-0.60%, silicon in a range of 0.15-0.30%, phosphorus no more than 0.030%, sulfur no more than 0.030%, and ferrum as a remaining component.

7. The compact steel cord according to claim 1, wherein, a wire rod used for the middle-layer M steel wires and the outer-layer O steel wires comprises the following components in percentage by weight of the wire rod: carbon in a range of 0.60-1.02%, manganese in a range of 0.30-0.70%, silicon in a range of 0.15-0.30%, phosphorus no more than 0.030%, sulfur no more than 0.030%, chromium no more than 0.35%, and ferrum as a remaining component.

8. The compact steel cord according to claim 2, wherein, a wire rod used for the core-filament I steel wire comprises the following components in percentage by weight of the wire rod: carbon≤0.86%, manganese in a range of 0.30-0.60%, silicon in a range of 0.15-0.30%, phosphorus no more than 0.030%, sulfur no more than 0.030%, and ferrum as a remaining component.

9. The compact steel cord according to claim 3, wherein, a wire rod used for the core-filament I steel wire comprises the following components in percentage by weight of the wire rod: carbon≤0.86%, manganese in a range of 0.30-0.60%, silicon in a range of 0.15-0.30%, phosphorus no more than 0.030%, sulfur no more than 0.030%, and ferrum as a remaining component.

10. The compact steel cord according to claim 4, wherein, a wire rod used for the core-filament I steel wire comprises the following components in percentage by weight of the wire rod: carbon≤0.86%, manganese in a range of 0.30-0.60%, silicon in a range of 0.15-0.30%, phosphorus no more than 0.030%, sulfur no more than 0.030%, and ferrum as a remaining component.

11. The compact steel cord according to claim 2, wherein, a wire rod used for the middle-layer M steel wires and the outer-layer O steel wires comprises the following components in percentage by weight of the wire rod: carbon in a range of 0.60-1.02%, manganese in a range of 0.30-0.70%, silicon in a range of 0.15-0.30%, phosphorus no more than 0.030%, sulfur no more than 0.030%, chromium no more than 0.35%, and ferrum as a remaining component.

12. The compact steel cord according to claim 3, wherein, a wire rod used for the middle-layer M steel wires and the outer-layer O steel wires comprises the following components in percentage by weight of the wire rod: carbon in a range of 0.60-1.02%, manganese in a range of 0.30-0.70%, silicon in a range of 0.15-0.30%, phosphorus no more than 0.030%, sulfur no more than 0.030%, chromium no more than 0.35% and ferrum as a remaining component.

13. The compact steel cord according to claim 4, wherein, a wire rod used for the middle-layer M steel wires and the outer-layer O steel wires comprises the following components in percentage by weight of the wire rod: carbon in a range of 0.60-1.02%, manganese in a range of 0.30-0.70%, silicon in a range of 0.15-0.30%, phosphorus no more than 0.030%, sulfur no more than 0.030%, chromium no more than 0.35%, and ferrum as a remaining component.

* * * * *